(12) United States Patent
Howard

(10) Patent No.: US 9,815,325 B2
(45) Date of Patent: Nov. 14, 2017

(54) UNIVERSAL MULTI-TERRAIN BRAKE SYSTEM (UBS) WITH ADJUSTABLE WHEEL TRACTION (AWT)

(71) Applicant: Reginald Bertram Howard, Brown Deer, WI (US)

(72) Inventor: Reginald Bertram Howard, Brown Deer, WI (US)

(73) Assignee: Reginald B. Howard, Brown Deer, WI (US)

( * ) Notice: Subject to any disclaimer, the term of this patent is extended or adjusted under 35 U.S.C. 154(b) by 0 days.

(21) Appl. No.: 14/494,595

(22) Filed: Sep. 24, 2014

(65) Prior Publication Data

US 2017/0008335 A1    Jan. 12, 2017

(51) Int. Cl.
| B60B 15/10 | (2006.01) |
| B60T 8/56 | (2006.01) |
| B60T 8/1761 | (2006.01) |
| B60T 8/171 | (2006.01) |
| B60T 8/175 | (2006.01) |
| B60C 27/00 | (2006.01) |

(Continued)

(52) U.S. Cl.
CPC .............. *B60B 15/10* (2013.01); *B60T 8/171* (2013.01); *B60T 8/175* (2013.01); *B60T 8/17616* (2013.01); *B60T 8/56* (2013.01); *B60B 39/00* (2013.01); *B60B 2900/351* (2013.01); *B60B 2900/721* (2013.01); *B60C 27/00* (2013.01); *B60C 27/045* (2013.01); *B60T 2210/12* (2013.01)

(58) Field of Classification Search
CPC .............. B60B 15/10; B60B 2900/351; B60B 2900/721; B60B 39/00; B60T 8/171; B60T 8/175; B60T 8/17616; B60T 8/56; B60T 2210/12; B60C 27/00; B60C 27/0261; B60C 27/045
USPC ....................................... 303/139; 188/4 R, 5
See application file for complete search history.

(56) References Cited

U.S. PATENT DOCUMENTS

| 2,174,944 A | * | 10/1939 | Leggett .................. B60B 15/16 301/40.2 |
| 2,241,849 A | * | 5/1941 | Fuchs ..................... B60B 11/06 301/38.1 |

(Continued)

*Primary Examiner* — Thomas Irvin
(74) *Attorney, Agent, or Firm* — Reginald B. Howard

(57) ABSTRACT

This invention relates to a universal brake system (UBS) that combines features from an adjustable wheel traction system (WTS) and an improved anti-lock brake (ABS) system. The WTS provides a plurality of extendable and retractable spikes contained in a wheel assembly or wheel adapter to increase traction (friction) between a vehicle's wheel and its supporting surface. To further improve wheel traction each wheel spike has different types of changeable heads for different types of terrain and road surfaces. When operating in dry road mode, the UBS operates as an anti-lock braking system except the spikes can operate during emergency braking to provide additional traction between the tire and wheel support surface. When operating in slippery road mode, the UBS activates the WTS for increase traction control and utilize an improved computer controlled anti-lock braking system to alternate between wheel lock and anti-lock brake with skid control to provide the ultimate solution to decreasing a vehicle's stopping distance and controlling a vehicle's skid on slippery and dry road surfaces.

7 Claims, 20 Drawing Sheets

Wheel Traction System Adapter Assembly

(51) Int. Cl.
*B60C 27/04* (2006.01)
*B60B 39/00* (2006.01)

(56) References Cited

U.S. PATENT DOCUMENTS

| | | | | |
|---|---|---|---|---|
| 2,463,634 A * | 3/1949 | Martinis | ............ | B60B 15/00 180/15 |
| 2,700,926 A * | 2/1955 | Goit | ............ | A01B 45/02 172/22 |
| 2,941,566 A * | 6/1960 | Prince | ............ | B60C 11/1612 152/208 |
| 3,098,516 A * | 7/1963 | Vasiljevic | ............ | B60C 11/16 152/210 |
| 3,482,880 A * | 12/1969 | Ceccucci | ............ | B60B 15/26 301/47 |
| 3,672,421 A * | 6/1972 | Anderson | ............ | B60C 11/1612 152/208 |
| 4,154,488 A * | 5/1979 | Svensson | ............ | B60B 15/10 301/48 |
| 4,603,916 A * | 8/1986 | Granryd | ............ | B60B 15/10 152/213 A |
| 4,648,853 A * | 3/1987 | Siegfried | ............ | A63H 17/262 180/7.1 |
| 4,906,051 A * | 3/1990 | Vilhauer, Jr. | ............ | B60B 15/26 301/38.1 |
| 5,788,335 A * | 8/1998 | O'Brien | ............ | B60B 15/26 301/40.6 |
| 6,022,082 A * | 2/2000 | O'Brien | ............ | B60B 15/263 152/216 |
| 7,490,418 B2 * | 2/2009 | Obeydani | ............ | A43C 15/14 36/61 |
| 9,045,013 B2 * | 6/2015 | Fink | ............ | B60C 27/068 |
| 9,205,713 B2 * | 12/2015 | Fink | ............ | B60C 27/068 |
| 2011/0290511 A1 * | 12/2011 | Nahass | ............ | A01D 43/12 172/21 |
| 2013/0300185 A1 * | 11/2013 | Zhavi | ............ | B60B 15/10 301/47 |

* cited by examiner

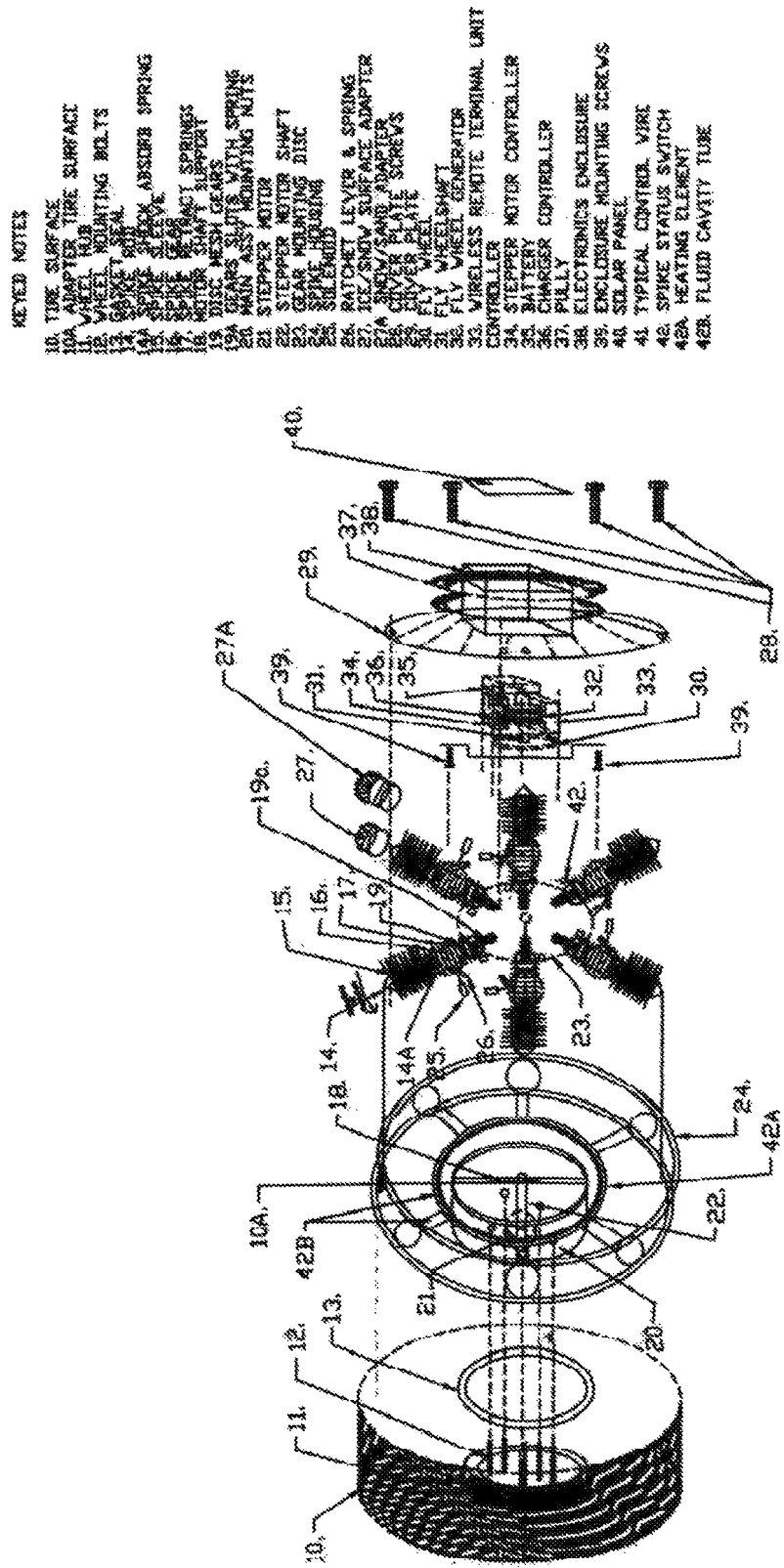
FIG 1. Wheel Traction System Adapter Assembly

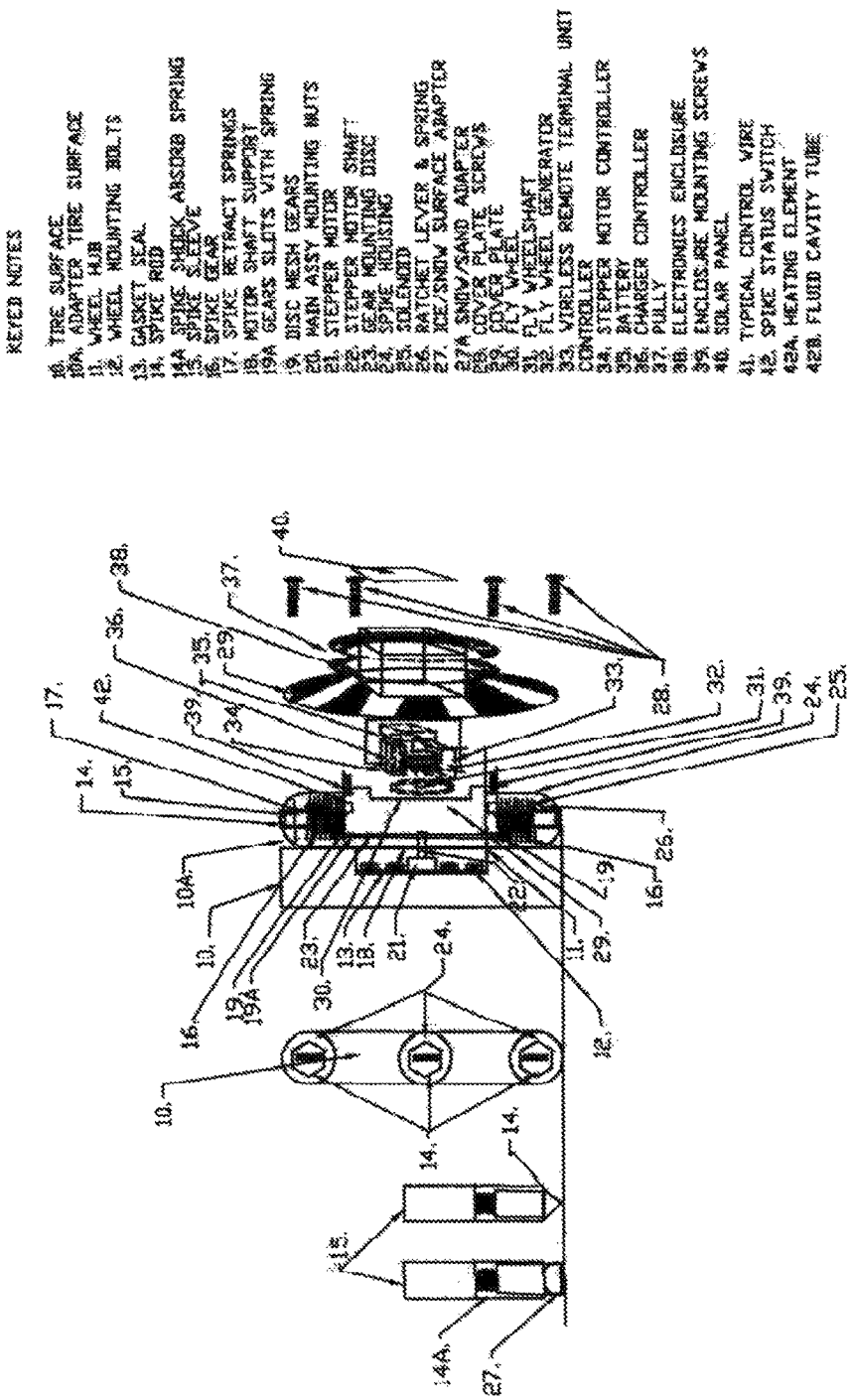
FIG 2. Wheel Traction Adapter Assembly—Leftside View

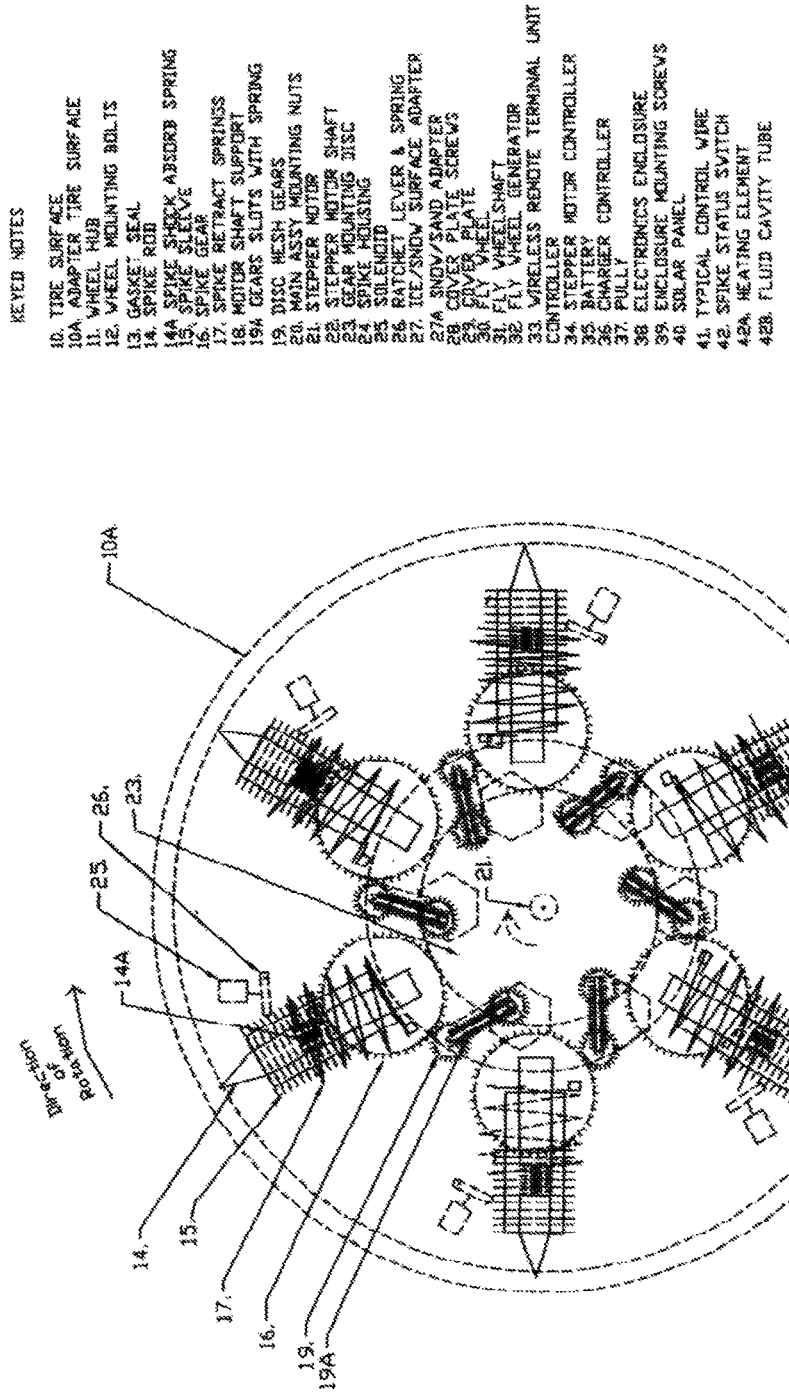
FIG. 3 Wheel Traction Assembly with Spikes Retracted Frontview

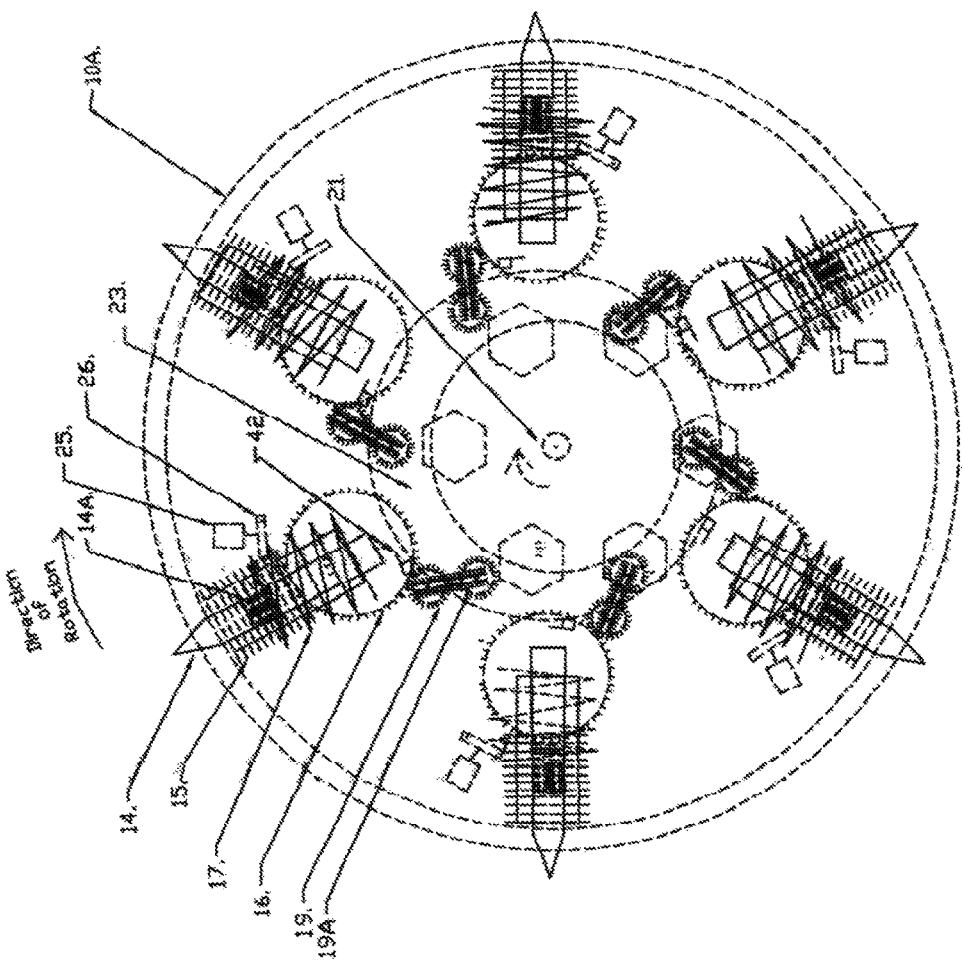
FIG 4 Wheel Traction Assembly with Spikes Extended Frontview

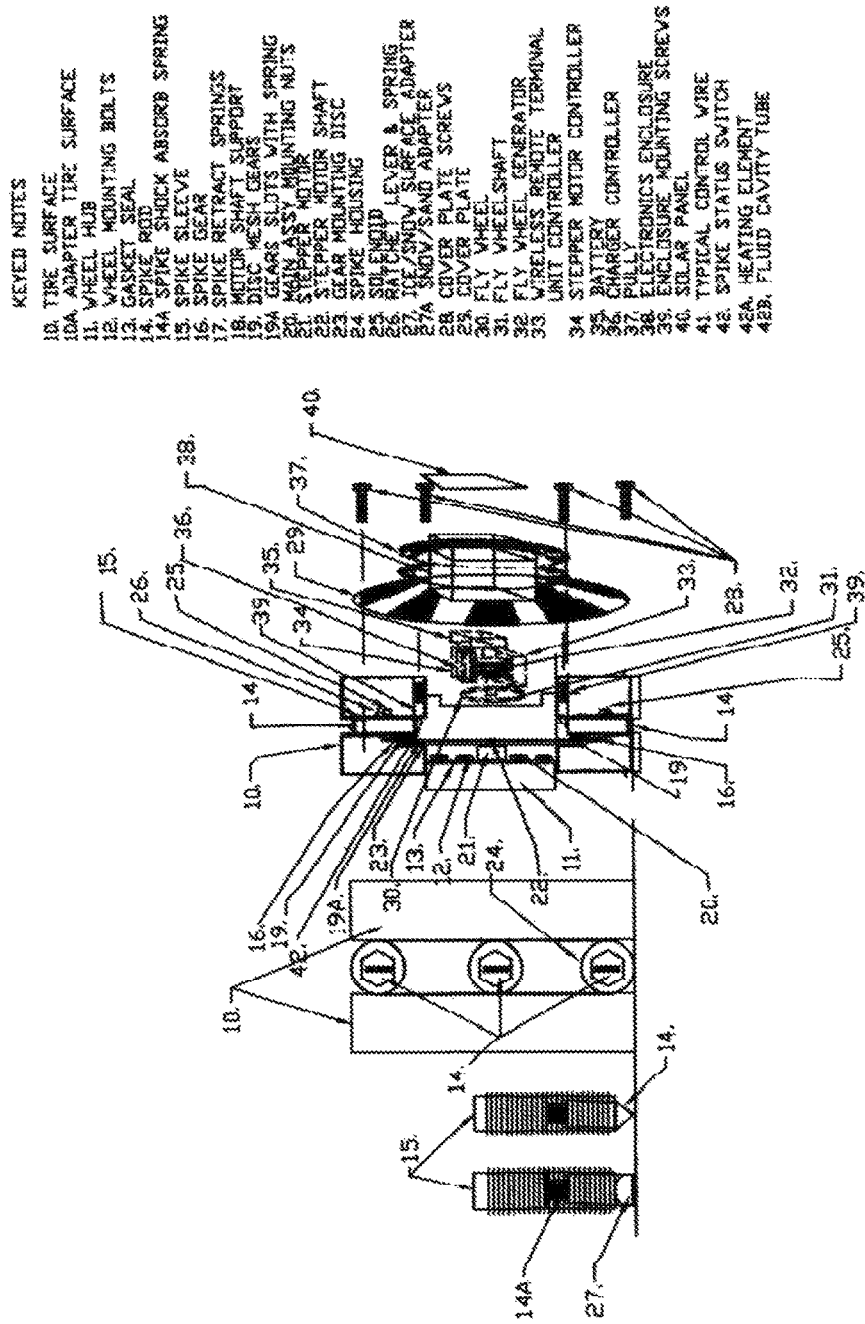
FIG. 5. Wheel Traction System – Installed Inside Wheel Assembly Left Sideview

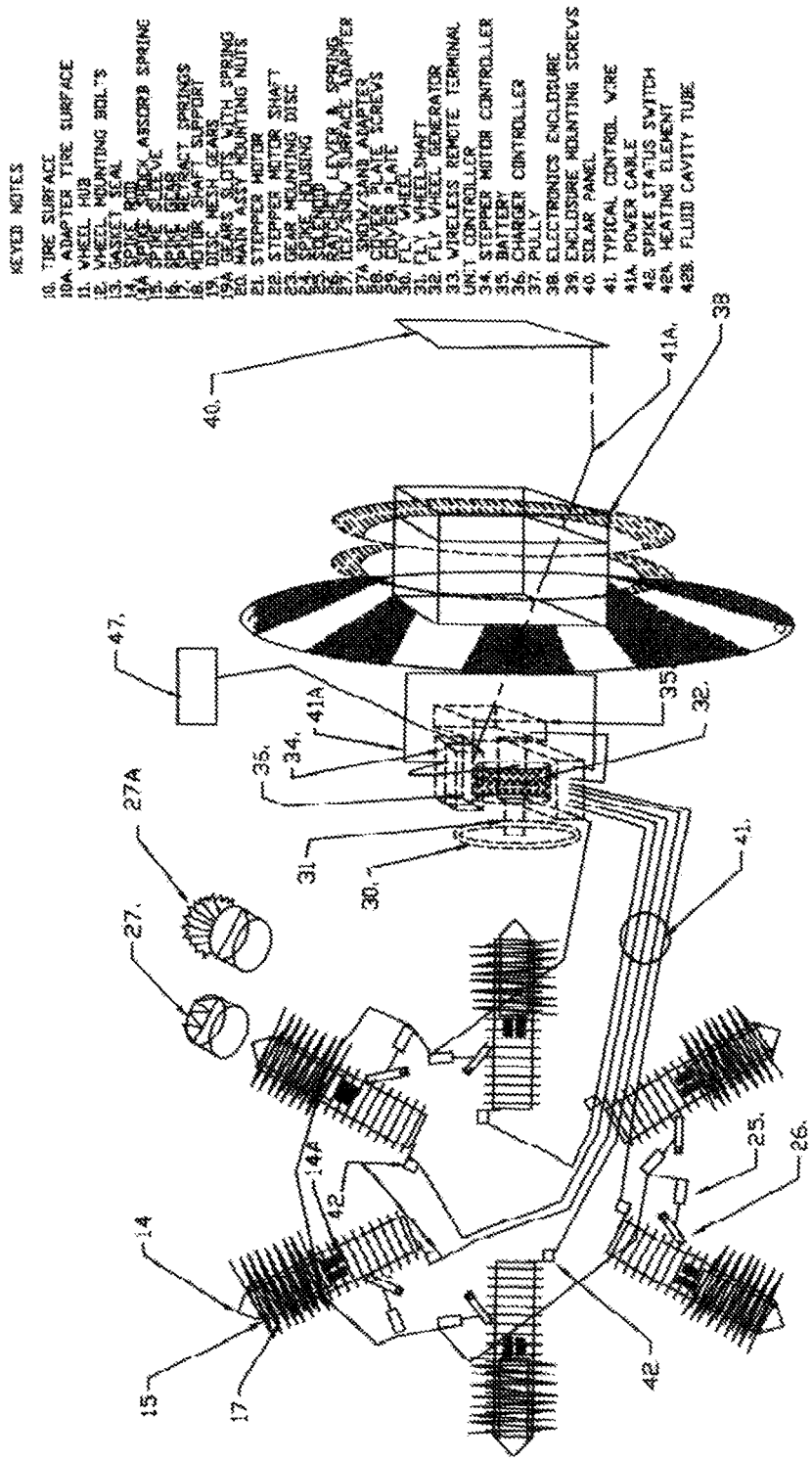
Fig 6. Wheel Traction System Major Components Wiring Diagram

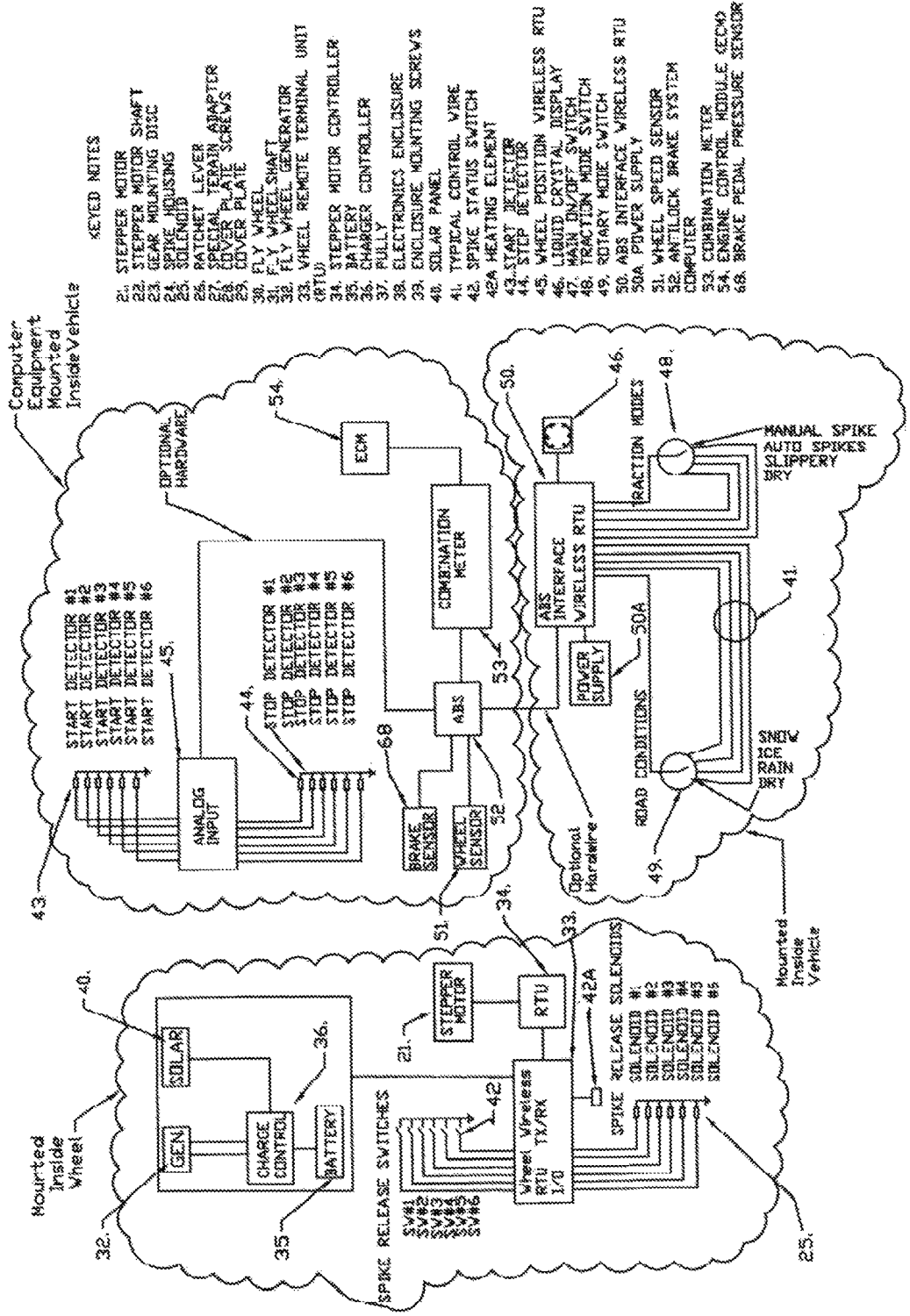
Fig. 7 Universal Braking System Schematic

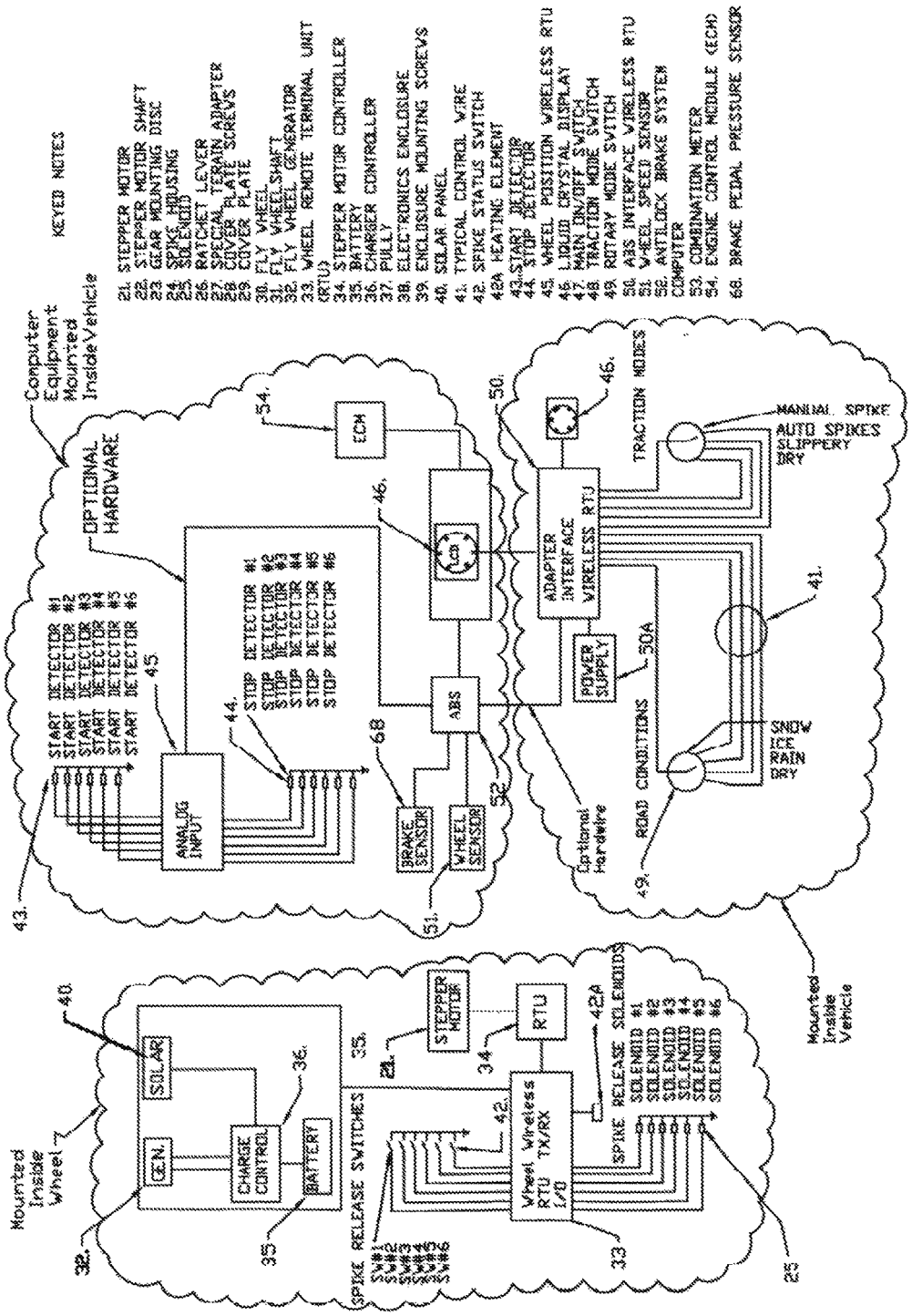
FIG 8. Wheel Traction System Adapter Schematic

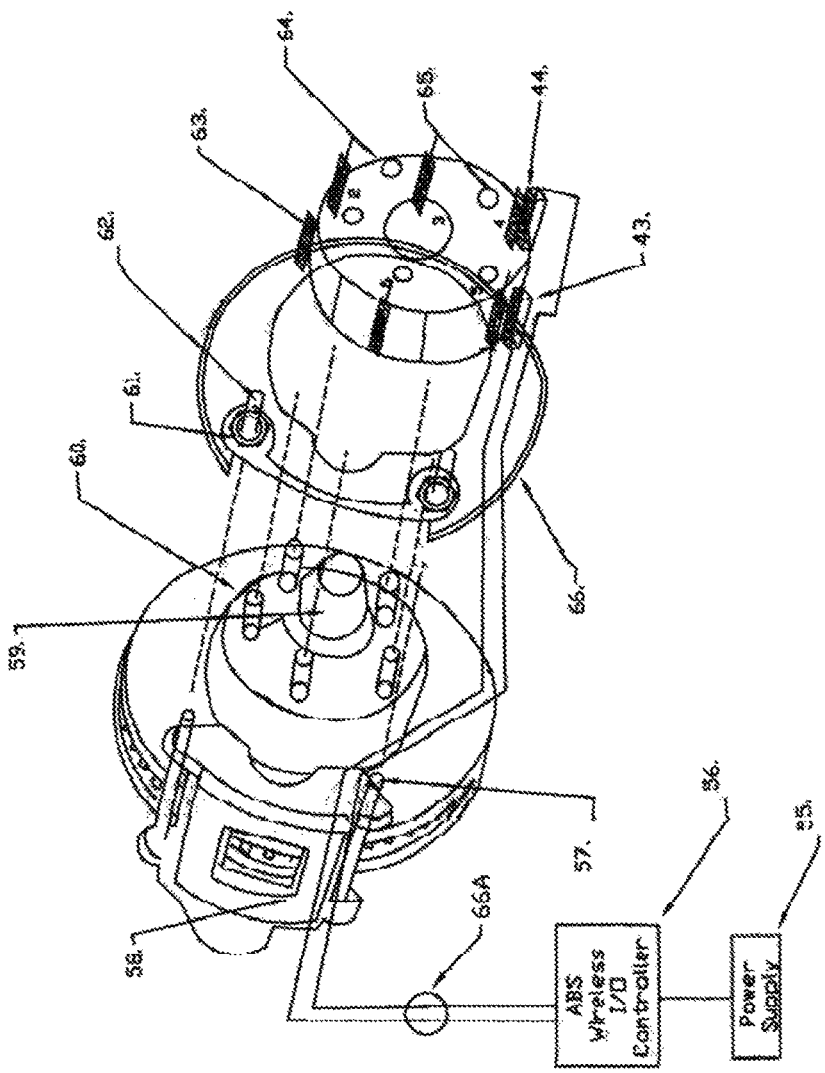
Fig. 9, Wheel Position Sensor Assembly

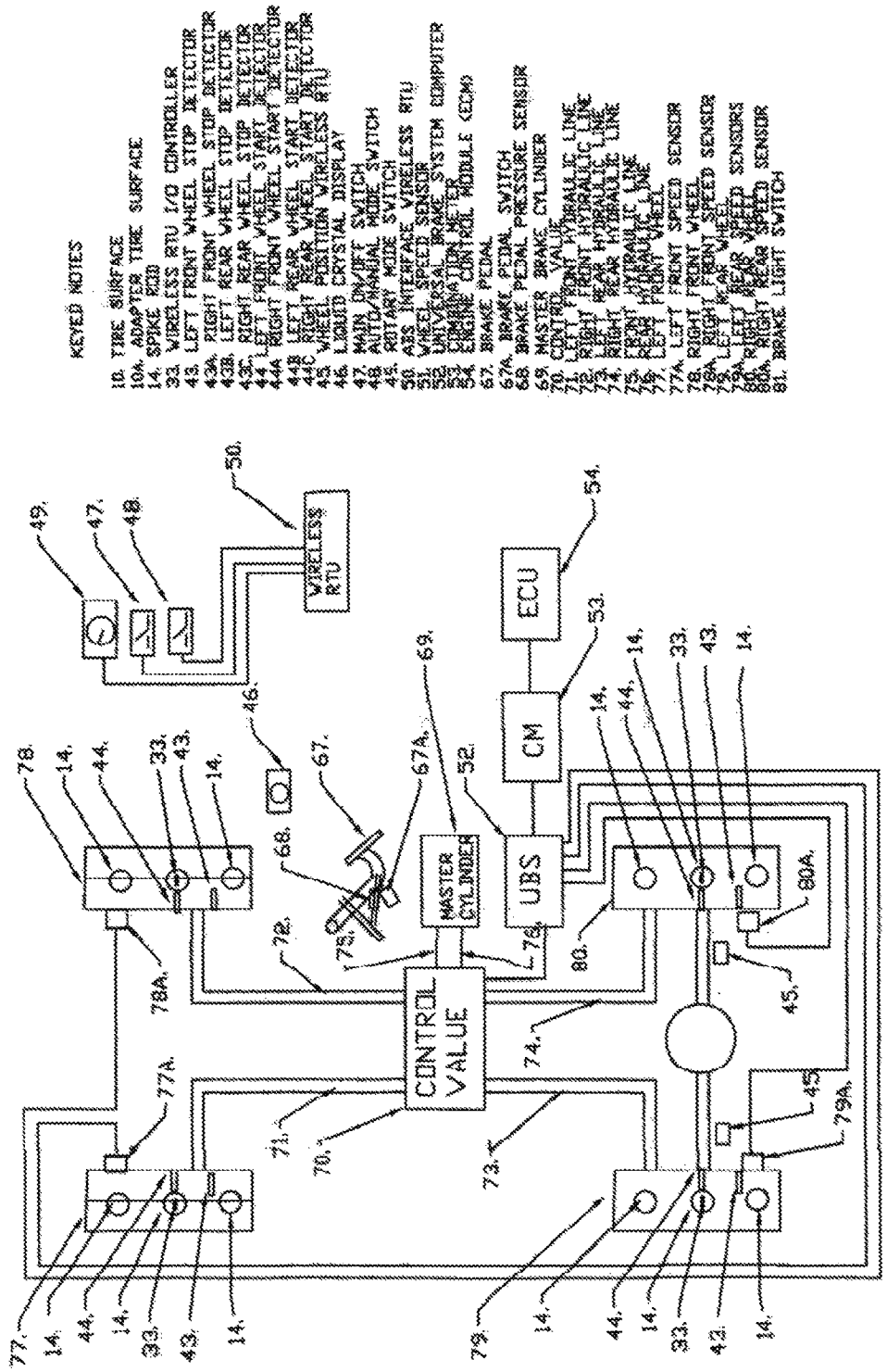
Fig 10. Universal Braking System - Overall Diagram

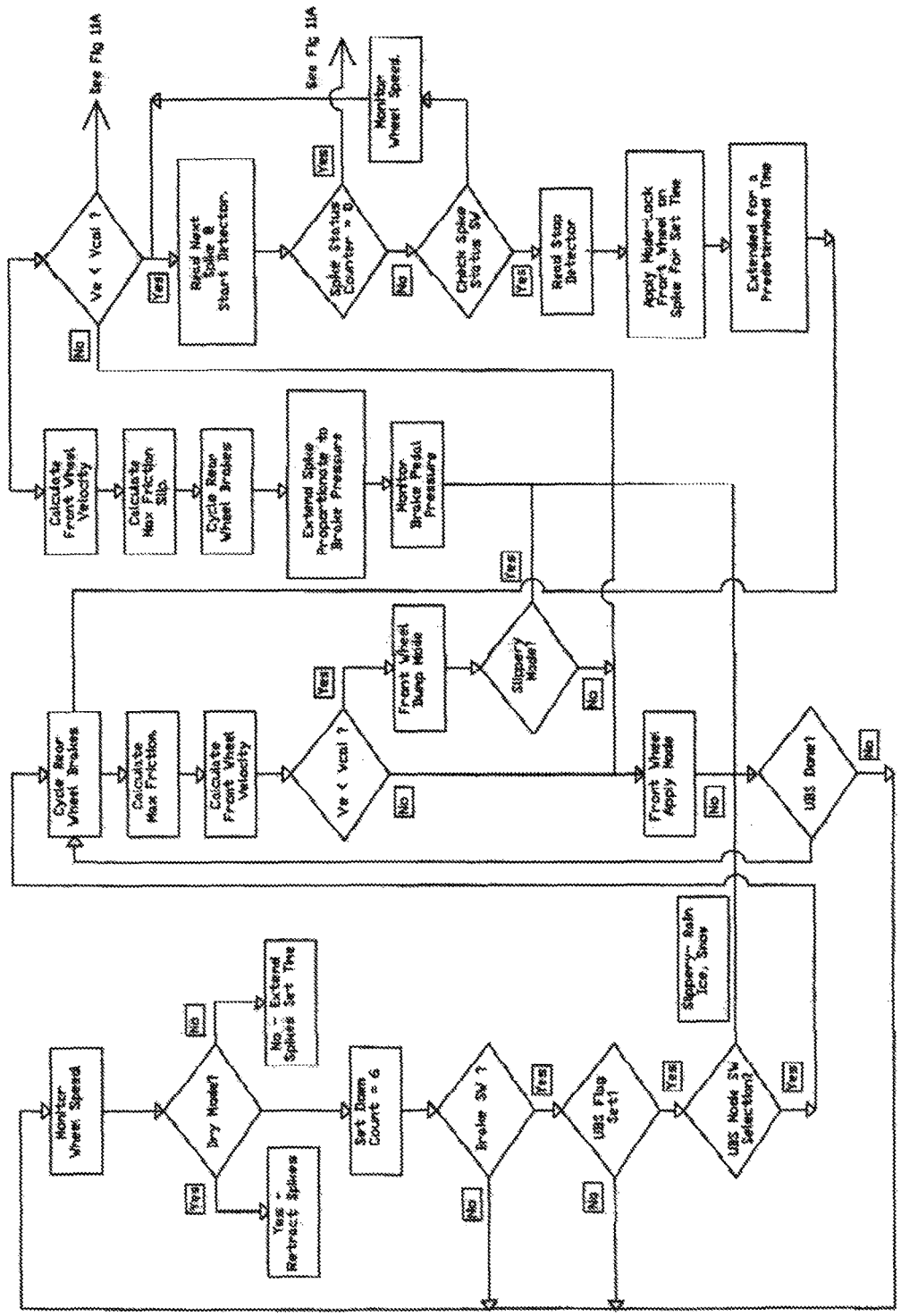
Fig. 11. Universal Braking System Computer Algorithem

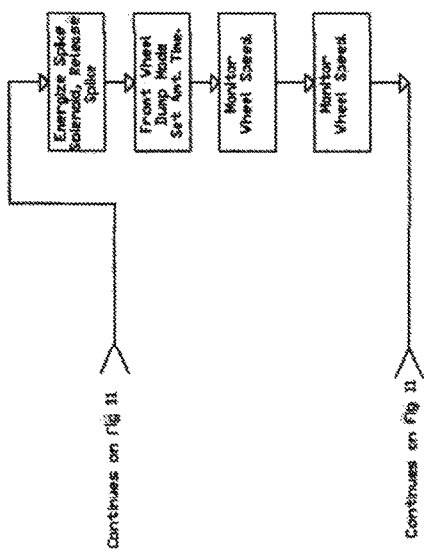
Fig 11A, Universal Braking System Computer Algorithmen

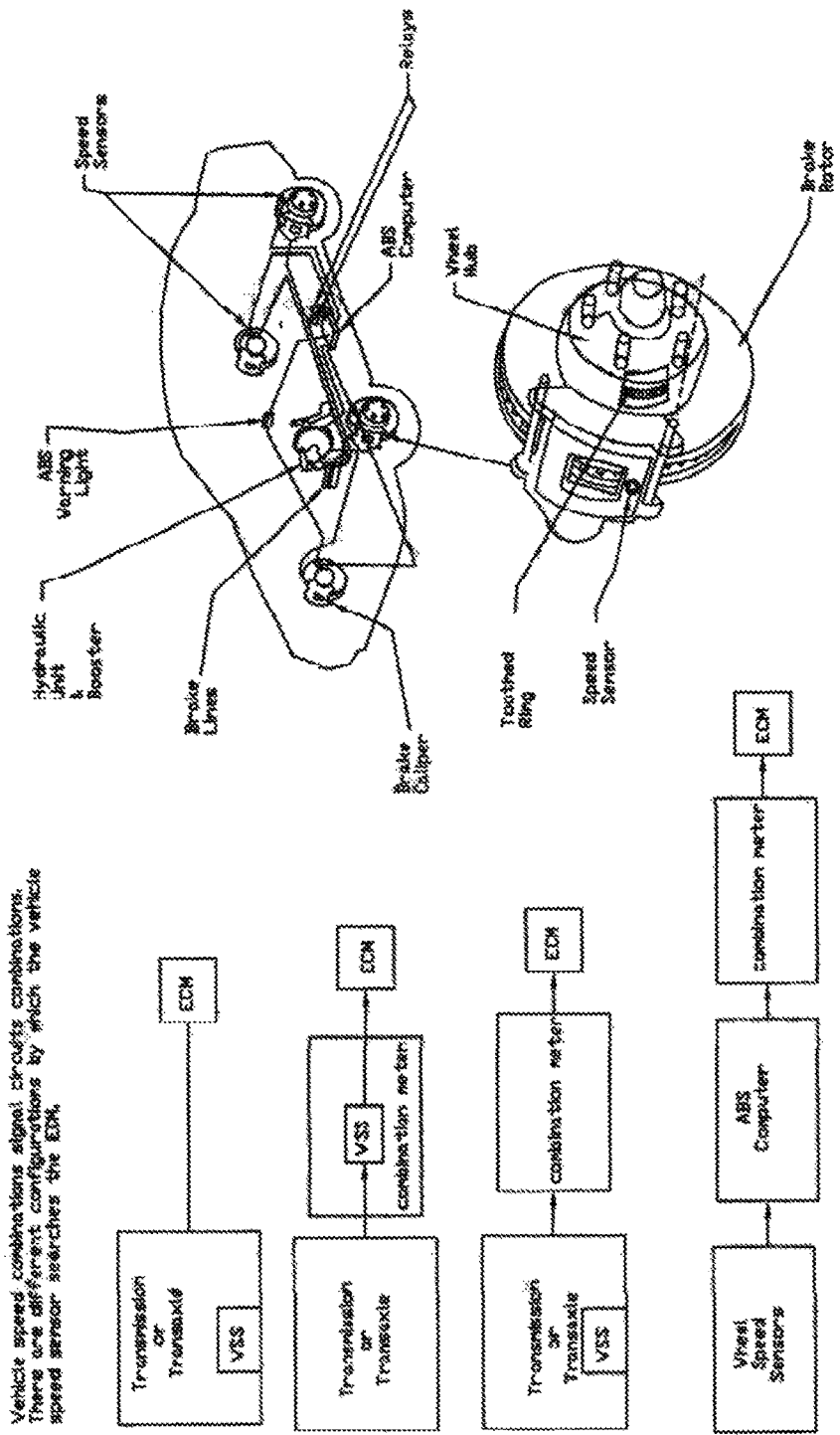

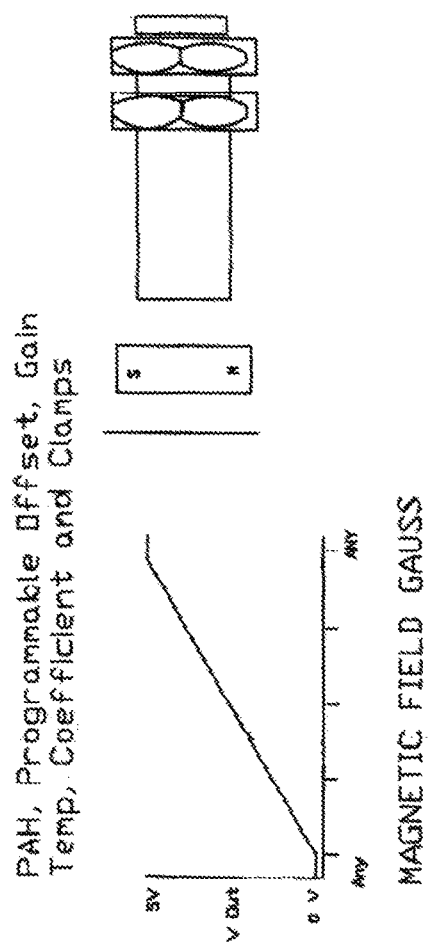
Fig 13. Magnetic Detector

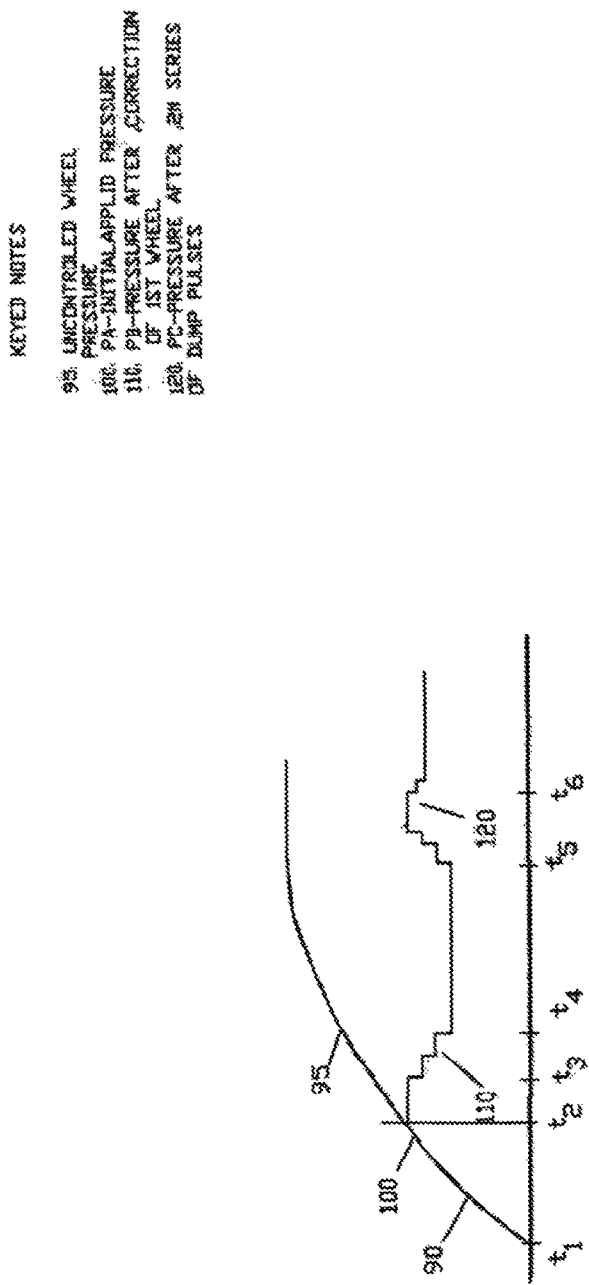
Fig 14 Applied Brake Pressure Dry Road Mode

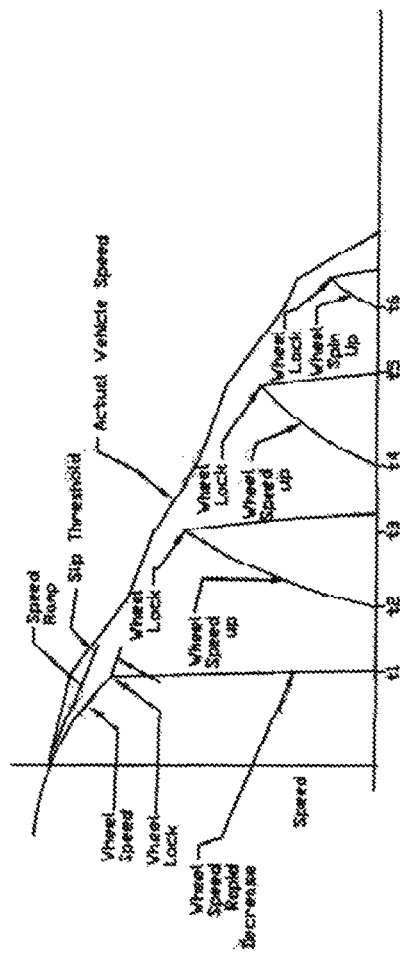
Fig 15 Vehicle Speed vs Wheel Speed Slippery Mode with WTS Active

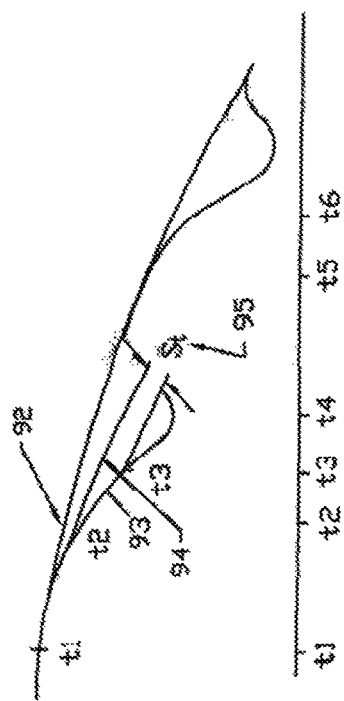
Fig. 16 Vehicle Speed vs Wheel Speed Dry Road Mode

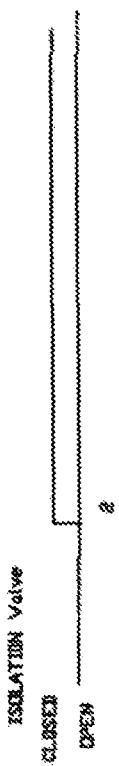

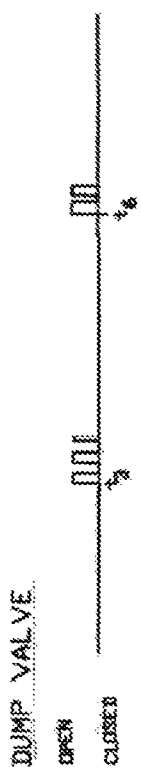
Fig 18 Dump Valve Operation - Dry Road Mode

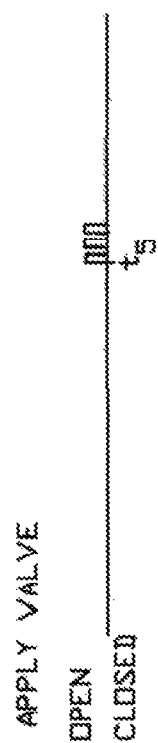
Fig 19 Apply Valve Operation

UNIVERSAL MULTI-TERRAIN BRAKE SYSTEM (UBS) WITH ADJUSTABLE WHEEL TRACTION (AWT)

CROSS-REFERENCE TO RELATED APPLICATIONS (MPEP 201.11)

61/881,916

STATEMENT REGARDING FEDERALLY SPONSORED RESEARCH OR DEVELOPMENT: (MPEP 310)

None

THE NAMES OF THE PARTIES TO A JOINT RESEARCH AGREEMENT (37 CFR 1.71 (g)

None

REFERENCE TO A "SEQUENCE LISTING," A TABLE, OR A COMPUTER PROGRAM LISTING APPENDIX SUBMITTED ON COMPACT DISC AND AN INCORPORATION-BY-REFERENCE OF THE MATERIAL ON THE COMPACT DISC

None

BACKGROUND OF THE INVENTION ((MPEP 608.01(c))

European Patent 1 603 781 B1 and U.S. Pat. No. 5,479,567A discloses an anti-skid control apparatus for a braking system of a vehicle having a left and right front wheels and left and right rear wheels. There are no federally sponsored research or development involved with this invention. These braking system are considered as prior art. This disclosed braking system includes: an adjustable modulator (not shown), for increasing a hydraulic pressure to oil cylinders of the left and right, and front and rear wheels of the vehicle in a hydraulic pressure increase mode, holding as is the current value of the hydraulic brake pressure in a hydraulic pressure holding mode, and for reducing the hydraulic brake pressure to the oil cylinder of said left and right, and said front and rear wheels of said vehicle in a hydraulic pressure reduction mode; a detection means for detecting the speed of said left and right, and said front and rear wheels of said vehicle; a slip detection means for judging by evaluating signal outputs from said detection means whether or not a slip of the extent to which anti-skid control is necessary has been generated in any of the front, rear, left and right wheels of said vehicle and a controller which controls the modulator based on the judged result of said slip detection means, and which selects and sets one of said hydraulic pressure increase mode, said hydraulic pressure holding mode and said hydraulic pressure reduction mode for each wheel. The controller provides an anti-skid control setting means for setting an anti-skid control for the wheel; the slip detection means judged that the anti-skid control is necessary; a hydraulic pressure control means for setting said adjustable modulator at either the pressure maintaining mode or the pressure reduction mode with regard to the wheel for which the anti-skid control has been set by said anti-skid control setting means until the slipping which triggered the anti-skid control disappears, and, when the slipping disappears, for setting the adjustable modulator at the pressure increase mode in condition that the wheel speed of the wheel is increasing; and a pressure increase restriction means for determining whether slip is increasing at the pair of front or rear wheels to which the wheel the pressure increase mode is set does not belong, and converting the pressure increase mode to either the pressure maintaining mode or the pressure decrease mode if the slip at the pair of front or rear wheels is increasing.

An Anti-lock Brake System (ABS) is often included as standard equipment on new vehicles. However, an ABS alone has proven to be ineffective with controlling a vehicle's skidding on slippery rigid surfaces such as wet roads, ice or snow covered roads and non-ridge surfaces such as sand and loose gravel. The obvious problem is that standard rubber tires or even specialize tires with customize treads offer very little traction on the above mention road surfaces especially during heavy braking conditions which in most cases lead to an out of control skidding vehicle. This situation can only be remedied with the intervention of a device that can re-establish traction (friction) between a wheel and its supporting surface and then applying a combination of anti-lock brake with skid control and locking brake when the demand for a rapid stop on slippery road surfaces is required. Hence the invention provides a solution to the problem by providing an adjustable wheel traction system integrated with prior-art ABS technology. The new integrated braking system invention is called a universal braking system (UBS).

BRIEF SUMMARY OF INVENTION

1) This invention relates to a universal brake system (UBS) that combines features from a prior art anti-lock brake system (ABS) with a new technology called an adjustable wheel traction system. This combination of technology provides a vehicle operator with the ability to control skidding and reduce a vehicle stopping distance on dry surfaces and particularly on slippery road surfaces e.g. wet roads, ice covered roads, snow covered roads and non-rigid surfaces such as sand and loose gravel. It is important to note that today's conventional ABS's are most effective on dry rigid road surfaces e.g. concrete or asphalt and less effective on slippery wet roads, icy or snow covered rigid road surfaces and non-rigid surfaces such as sand and loose gravel. This is due to the obvious lack of tire traction on these types of road surfaces which can make controlling a vehicle's skidding almost impossible with just an ABS. Hence, the invention of the UBS solves the problem with the lack of wheel traction (friction) and skid control on dry, wet, frozen and slippery roads by utilizing an adjustable wheel traction system that can extend and retract wheel spikes on demand as a result of a vehicle operator pressing a vehicle's brake pedal, and using the brake controller systems to alternate between locking a wheel on a spike long enough time for it to penetrate one of said mentioned types of road surfaces and then measuring the wheel slip of the rear wheel and switching back to anti-lock and anti-skid mode momentarily. This cycle is repeated until the slip that cause the wheel to lockup goes away.

2) The wheel traction system consist of a plurality of spikes embedded in a wheel's housing and controlled by a brake system microprocessor controller which can automatically upon an operator pressing a vehicle's brake pedal extend spike rod 14 outward beyond a wheel's supporting surface in order to create friction (traction) with a wheel's supporting surface. Spikes are automatically retracted when a vehicle's operator release the brake pedal if the unit is operating in the automatic mode.

3) The wheel traction system has several modes of operation that determines how much the plurality of spikes extends outward beyond a wheel surface. The modes of operation are based on the types of road surfaces and road conditions a vehicle will is driven on. Here is a summary of the different modes of operation: A) Dry mode—no spikes are extended except under emergency braking conditions otherwise the braking system works as an anti-locking braking system with continuous wheel slip control. B) Wet Mode—A plurality of spike are extended a predetermined distance upon a vehicle operator pressing a vehicle brake pedal. In this mode, the braking system microprocessor controller allows a wheel to momentary lockup on a spike long enough time for it to dig-into the vehicle supporting surface in order to create traction (friction) between a tire and its supporting surface. C) Ice Mode—works the same as wet mode except the predetermined distance that spikes are extended is a little more than in the wet mode. D) Snow Mode—works the same as the ice mode except the predetermined distance spikes are extended is a little more than the ice mode.

4) The wheel traction system has two configurations: a) The wheel traction system is integrated into a vehicle's wheel assembly FIG. 5. This configuration is best suited for new vehicles or vehicles that are having their wheels replaced in order to take advantage of the safety features of the wheel traction system. b) The second configuration is an independent adapter to be mounted outside of an existing vehicle's wheel. This configuration is designed mainly to adapt to an existing vehicle wheel.

5) Power for the wheel traction system is via a fly wheel generator mounted inside a wheel assembly or adapter assembly, a battery pack and a solar panel with charge controller. The unit can also be powered optionally from a vehicle's power system via hardwiring not shown.

6) Communication to the wheel retraction system is via a wireless remote terminal unit (RTU) 33 microprocessor controller mounted internally to the wheel assembly or adapter assembly and communicates wirelessly with a vehicle's wireless brake RTU 50 controller and/or engine control unit (ECU). An alternate method of communication is via hardwired connections between RTU's and ECU.

7) A plurality of spikes are mounted on a circle disc with each spike having its own gear 16 that mesh with a gear on the gear disc 23. Each spike has a solenoid 25 control latch 26 that allows the spike to be release and extend under the power of a stepper motor 21 and latch in place when extended. Each spike has means to absorb shock via spring 14A. Solenoid 25 pulls the latch 26 away from spike teeth to allow the spike to retract under the power of spring 17 when a brake pedal is released. Individual wheel rotational velocities are controlled by selective operation of dump and apply valves that control the wheel brake pressure applied at each of the wheels. The operation of the valves provides three modes of operation, namely, dump to reduce the applied pressure, apply to increase the applied pressure, and hold to maintain the applied pressure at the current level.

BRIEF DESCRIPTION OF DRAWINGS

FIG. 1. Wheel Traction System Adapter Assembly—Shows the components and assembly of a wheel traction system adapter attached to a vehicle's wheel.

FIG. 2. Wheel Traction Adapter Assembly Left Side view—A side view of the assembly of a wheel traction system attached to a vehicle's wheel.

FIG. 3. Wheel Traction Assembly with Spikes Retracted Front View—A front view of the wheel traction system with the spikes retracted.

FIG. 4. Wheel Traction Assembly with Spikes Extended Front view—A front view of the wheel traction system with the spikes extended.

FIG. 5 Wheel Traction System Installed Inside Wheel Assembly—illustrates how the wheel traction system is installed inside a vehicle's wheel.

FIG. 6. Wheel Traction System Major Component Wiring Diagram—Illustrates the wiring of major components of the wheel traction system.

FIG. 7. Universal Braking System Schematic—Shows how electrical components of the UBS are wired and there location in a vehicle.

FIG. 8. Wheel Traction System Adapter Schematic block diagram—Illustrates the wiring of major computer components of the wheel traction system.

FIG. 9. Wheel Position Sensor Assembly—illustrates how start and stop detectors and magnetic sensors are installed on a vehicle's wheel.

FIG. 10. Universal Braking System overall system components—A schematic diagram showing major components of the UBS installed in a rear wheel vehicle.

FIG. 11. Universal Braking System Computer Algorithm—A flow chart of the braking system computer algorithm that is in accordance with the invention FIG. 11A. Universal Braking System Computer Algorithm—Continuation from FIG. 11.

FIG. 12 ABS Prior Art References—Vehicle speed sensor signal circuit combination and a typical vehicle brake and wheel assembly with ABS components installed.

FIG. 13. Magnetic Position Detector—Assembly drawing of the wheel position sensors and detectors.

FIG. 14 illustrates the pressure being applied to one of the wheel brake cylinders as a function of time. At $t_1$ the brake pedal 12 is depressed to begin applying pressure to the brake cylinders.

FIG. 15 shows the actual vehicle speed during heavy braking application in the slippery road mode with wheel traction system active. The actual wheel speed begins to decrease relative to the actual vehicle speed as heavy braking begins. Mean while, the microprocessor in the ECU 54 has calculated a theoretical speed ramp based on the selected slippery road surface that represents the speed the vehicle would travel when decelerated at a predetermined maximum rate, such as 1.0 g. When the difference between the actual wheel speed and the calculated speed ramp exceeds a predetermined slip threshold $S_t$, it is an indication that the wheel has potential to lock-up at $t_1$. The ECU then reads the spike the start detector 44 on the slipping wheel for the next available spike, reads the spike status switch 42 for an OK on the spike extension, then the microprocessor causes the apply valve associated with the wheel brake to close, as illustrated in FIG. 19, causing the wheel to lockup for a predetermined amount of time up to $t_2$. The wheel speed remains at zero until $t_2$ at which time the ECU selectively reduce the pressure of the hydraulic fluid being applied to the wheel cylinder. Accordingly, the ECU microprocessor applies a series of pulses labeled shown in FIG. 18 to the dump valve associated with the wheel cylinder to lower pressure sufficiently to cause the wheel to spin back up until the slip threshold is reached again then repeat the lock wheel cycle over until the vehicle has come to a stop or the vehicle operator has reduced brake pedal pressure below a set pressure threshold. Once a wheel has locked, the wheel spikes will remain extended for a predetermined time to prevent the vehicle from immediately re-entering a skid on a slippery surface.

FIG. 16 shows the actual vehicle speed during the brake application in the dry road mode as a function of time is illustrated by the line labeled 92. After $t_1$, the actual wheel speed 93 begins to decrease relative to the actual vehicle speed 92. Mean while when the microprocessor detects that the wheel deceleration has reached a predetermined threshold value, such as 1.3 g, at $t_2$. The microprocessor continues to monitor the speed of the wheel relative to both the actual wheel speed and theoretical speed ramp. When the microprocessor detects that the wheel deceleration has reached a predetermined threshold value, such as 1.3 g, at $t_2$, the microprocessor causes the isolation valve associated with the wheel brake to close, as illustrated in FIG. 17, limiting the pressure applied to the wheel cylinder of a constant level $P_A$ in FIG. 14.

FIG. 17 shows at $t_2$ the microprocessor in dry road mode causes the isolation valve associated with the wheel brake to close, and limiting the pressure applied to the wheel cylinder of a constant level $P_A$. The uncontrolled wheel brake pressure would continue to follow the dashed curve labeled 45 in FIG. 2A.

FIG. 18 illustrates the operation of the dump valve in the dry road mod. Upon correction of the second wheel speed departure with a second series of dump pulses, it is seen that the applied pressure $P_C$ while lower that the initial pressure $P_A$, as shown in FIG. 14 is greater than the pressure $P_B$ present after correction of the first wheel speed departure. Thus it is seen that the UBS provides control over the individual wheel speeds by switching between hold, dump and apply modes of operation of the solenoid valves included in the control valve 16.

FIG. 19 Illustrates the operation of the apply valve for dry road mode. It is desirable for the ECU microprocessor to apply a series of pulses at $t_5$ to the apply valve associated with the wheel cylinder to raise the pressure . . . . These pulsed precipitate a second wheel speed departure at $t_6$.

DETAILED DESCRIPTION OF INVENTION

The universal braking system disclosed comprises:
An adjustable wheel traction system configured as either a standalone wheel adapter or integrated into a vehicle's wheel assembly comprising:
An adapter housing 24 FIG. 1 containing a plurality of spikes 14 with teeth for latching to solenoid 25 and mounted internally to housing in a circular pattern and capable of automatically extending under the power of a stepper motor 21 and retracting under the power of spring 17, means for spike to absorb shock via spring 14A, said spike has interchangeable terrain adapters 27 and 27A used to improve friction between a tire a wheel's supporting surface, said spike has sleeves 15 to protect spike from debris and other foreign matter, outer rim of adapter housing 24 is a flexible surface 10 capable of supporting a vehicle if the main tire becomes flat, said housing contain plurality of elongated water tight cavities 42B running parallel to each spike and combining in a circular ring and containing an antifreeze coolant with an electric heating element 42A for heating said fluid, each said spike 14 contains a gear 16 that mesh with a mating gear 19 mounted near outer edge of main gear disc 23, said mating gears 19 are mounted in a slot and under spring tension to allow said gear to move under spike gear 16 if a spike becomes stuck, said gears diameter is set to determine the maximum distance each spike can extend, said spikes extend outward pass a tire supporting surface a predetermined distance in order to cause friction (traction) with a tire's supporting surface, said spike is extended a predetermined distance selected based on the friction coefficient of a tire's supporting surface such as that of slippery wet road, ice covered road, snow covered road, sand covered road or loose gravel road, said spike extend and retract proportionate to the amount of brake pedal 67 pressure being measure by brake pedal pressure sensor 68, said spikes contain means for locking extended spikes with latching solenoid 25 and ratchet lever 26, said spike is mechanically in contact with normally closed micro switch 42 that opens when a spike has extended outward from its housing, a means for self powering unit via a fly wheel generator 32 centrally mounted, said fly wheel 30 of generator builds up angular momentum as a vehicle's wheel rotates, said fly wheel rotates during braking to cause generator shaft to turn generator and produce electricity to power unit, said fly wheel generator 32 also provides power to charge a battery 35 via a charge controller 36 that is centrally mounted, a solar panel is mounted on the outside wall of adapter cover housing 29 and provides electricity when there is sun light to charge battery 35 via a charge controller 36, all electrical component are controlled by a centrally mounted wireless remote terminal unit RTU controller 33 mounted inside adapter housing or inside wheel assembly and is capable of wireless communication with the brake system wireless RTU controller 52 and engine control unit (ECU) 54 per computer algorithm in FIG. 11, said RTU 50 has a display 46 to display the status of system components, as an alternate configuration, wheel traction system can be part of a vehicle's wheel assembly FIG. 5 with all the features mention above, in addition both configurations can be configured for wireless communication with the braking system computer FIG. 7 and operate per computer algorithm FIG. 11. To provide complete wheel traction and skid control on dry, wet, frozen, slippery, rigid and non rigid road surfaces, the UBS integrates the above mention wheel traction system with features from prior art European Patent 1 603 781 B1 Anti-Lock Braking System. This combination makes the UBS a multifunctional system that is capable providing a vehicle with additional wheel traction and skid control on dry, wet, frozen, slippery, rigid and non rigid road surfaces depending on the terrain adapter selected and the depth of penetration of the wheel spikes. Configured as a standalone wheel adapter FIG. 1 the wheel traction system per computer schematic FIG. 8 can be controlled by a vehicle operator with wireless communications from its main remote terminal controller (RTU) 33 to a second wireless RTU 50 mounted inside of a vehicle with operator inputs from a rotary switch 49 for operator to select a predetermined amount of spike penetration distance based on a tire's supporting surfaces e.g. wet road, ice covered road or snow covered roads and inputs from rotary switch 48 that selects manual traction or automatic traction. A fully configured UBS has the following modes of operation:

Traction Modes
  Manual Traction—Function as an adjustable wheel traction system with spikes locked in a fully extended position. Spikes extended length is selectable based on road conditions e.g. wet conditions, Icy conditions, snowy conditions.
  Auto Traction—Function as an adjustable wheel traction system with spikes extending automatically and proportionate to the amount of brake pedal pressure.

Spikes extension length is selectable based on road conditions e.g. wet conditions, icy conditions, or snowy conditions.

Slippery Roads—Functions as a complete universal brake system that alternate between lock brakes and anti-lock brakes controls while using an adjustable wheel traction system to gain traction on slippery rigid and non rigid road surfaces such as wet roads, ice or snow covered roads or non-rigid surfaces such as sand or loose gravel covered road surfaces. Spikes extended length is selectable based on road conditions e.g. wet conditions, icy conditions, and snowy conditions.

Dry Road—Function as an anti-lock brake system with continuous slip control. Wheel traction system is inactive in this mode.

For all modes the terrain adapter 27 and 27A are selected to match road conditions in order to create the maximum amount of friction between a tire or wheel supporting surface.

In manual spike mode said spikes stay extended a fix predetermined distance based on road conditions. In this mode said spikes 14 will stay extended until the unit is switch to automated mode or any other position, In automatic spike mode spikes will extend and retract proportionate to the brake pedal 67 FIG. 10 with pressure measured by sensor 68. Spikes extension length is selectable based on road conditions e.g. wet condition, icy conditions, and snowy conditions. In slippery mode the system is characterized as having all the features of a universal brake system. The wheel traction system described above is active upon an operator pressing said brake pedal 67 a long with brake switch 67A closing will cause a brake pressure to be measured at sensor 68, said spikes will extend proportionately to the amount of brake pedal pressure based on road conditions, e.g. wet conditions, icy conditions, or snowy conditions, a means for measuring wheel speeds (77,78,79, 80) FIG. 10, a means to detect the start position 44 and stop position 43 of each spike, a means for sensing 42 when a spike has extended from its housing, a means for extending spikes from their housing via stepper motor 21 and gear disc 23 and retracting said spikes via power from spring 17, a wireless communication means for interfacing with brake system computer 52 and ECU 54, a road condition switch 49 to select a predetermined depth of penetration of spikes based on the friction coefficient of different type of road surfaces and other conditions previously mentioned above, a fly wheel generator 32 centrally mounted in a wheel assembly FIG. 5 or in adapter assembly FIG. 1 for supplying power to all system components, a solar panel 40 and charge controller 36 and a battery pack 35 with entire unit constructed in a matter that keeps a wheel mechanically balanced; there is an adjustable modulator (not shown), for increasing a hydraulic pressure to oil cylinders of the left and right, and front and rear wheels of the vehicle in a hydraulic pressure increase mode, holding as is the current value of the hydraulic brake pressure in a hydraulic pressure holding mode, and for reducing the hydraulic brake pressure to the oil cylinder of said left and right, and said front and rear wheels of said vehicle in a hydraulic pressure reduction mode; a detection means for detecting the speed (77A, &78A) of said left and right, and said front and rear wheels (70A, 80A) of said vehicle; a slip detection means for judging by evaluating signal outputs from said detection means whether or not a slip of the extent to which momentary wheel-lock control is necessary to allow spikes time to penetrate slippery surface in order to generate traction (friction) between a tire on the wheel and supporting tire surface in any of the front, rear, left and right wheels of said vehicle and a controller 52 which controls the modulator based on the judged result of said slip detection means, and which selects and sets one of said hydraulic pressure increase mode, said hydraulic pressure holding mode and said hydraulic pressure reduction mode for each wheel. The braking controller provides the ability to read the spike start detector 44 to detect the next available spike, read the spike status switch 42, and then lock-wheel for a predetermined time on next available spike once it passes under the stop detector 43, each momentary wheel-lock to be followed by a return to the anti-lock mode with anti-skid control, after each initial wheel-lock condition spikes will remain extended for a predetermined time to insure vehicle does not immediately return into a skid; when in slippery mode the slip detection means judged that the locked brake control is necessary based on a predetermined slip threshold setting; a hydraulic pressure control means for setting said adjustable modulator at either the pressure maintaining mode or the pressure reduction mode with regard to the wheel for which the momentary locked brake control has been set by mode control switch 49 which sets the brake lock control setting and then alternating back and forth between locked brake mode and anti-lock brake mode until the slipping which triggered the lock brake control disappears FIG. 16, when the slipping disappears, set the adjustable modulator to the pressure increase mode such that the wheel speed of the wheel is increasing; and a pressure increase restriction means for determining whether slip is increasing at the pair of front or rear wheels to which wheel the pressure increase mode is set does not belong, and converting the pressure increase mode to either the pressure maintaining mode or the pressure decrease mode if the slip at the pair of front or rear wheels is increasing. In the event the spikes fail to extend as measured by UBS controller reading a closed switch for all spikes status switches 42 after UBS controller command to extend spikes, next UBS controller will energize latching solenoids to release wheel spikes and then momentarily enters dump mode to relieve brake pressure and allow wheel to spin up such that the spikes can be released by centrifugal force, after detection of an opened spike status switch 42 UBS controller releases solenoid to latch spikes in place. UBS brake controller to operate per computer algorithm in FIG. 11.

Dry Surface Mode— which includes an adjustable modulator (not shown), for increasing a hydraulic pressure to oil cylinders of the left and right, and front and rear wheels of the vehicle in a hydraulic pressure increase mode, holding as is the current value of the hydraulic brake pressure in a hydraulic pressure holding mode, and for reducing the hydraulic brake pressure to the oil cylinder of said left and right, and said front and rear wheels of said vehicle in a hydraulic pressure reduction mode; a detection means for detecting the speed of said left and right, and said front and rear wheels of said vehicle; a slip detection means for judging by evaluating signal outputs from said detection means whether or not a slip of the extent to which anti-skid control is necessary has been generated in any of the front, rear, left and right wheels of said vehicle and a UBS controller which controls the modulator based on the judged result of said slip detection means, and which selects and sets one of said hydraulic pressure increase mode, said hydraulic pressure holding mode and said hydraulic pressure reduction mode for each wheel. The UBS controller provides an anti-skid control setting means for setting an anti-skid control for the wheel; the slip detection means judged that the anti-skid control is necessary; a hydraulic pressure control means for setting said adjustable modulator at either the pressure maintaining mode or the pressure reduction mode with regard to the wheel for which the anti-skid control has been set by said anti-skid control setting means until the slipping which triggered the anti-skid control disappears, and, when the slipping disappears, for setting the adjustable modulator at the pressure increase mode such that the wheel speed of the wheel is increasing; and a pressure increase restriction means for determining whether slip is increasing at the pair of front or rear wheels to which the wheel the pressure increase mode is set does not belong, and converting the pressure increase mode to either the pressure maintaining mode or the pressure decrease mode if the slip at the pair of front or rear wheels is increasing.

Referring to the drawings, illustrated in FIG. 10 is a typical hydraulic brake system which includes prior art anti-lock brake system (U.S. Pat. No. 5,479,567A) integrated with invention Wheel Traction System. The brake system in FIG. 10 shown is for a rear wheel drive vehicle. The universal braking system includes a brake pedal 67 that is mechanically connected to a brake light switch 67A and a dual reservoir master cylinder 69. A first reservoir of the master brake cylinder 69 provides hydraulic brake fluid to a front wheel brake circuit, while a second reservoir supplies hydraulic fluid to rear wheel brake circuit.

The master cylinder first reservoir is connected to an UBS control valve 70 by a first hydraulic line 75 the second reservoir is connected to the control valve 70 by a second hydraulic line 76. The UBS control valve 70 includes a plurality of normally open and normally closed solenoid valves (not shown) and a separate source of pressurized hydraulic fluid, such as a motor driven pump (not shown). The pump is typically included in the body of the control valve 70 while the pump is mounted upon the exterior thereof. The control valve 70 is connected by first pair lines 72 and 71 to right and left front wheels 78 and 77, respectively. For the vehicle in FIG. 10, the front wheels 78 and 77 are non-driven also having front wheel and/or all wheel drive. Similarly, second pair of hydraulic brake lines 74 and 73 connects 70 to right and left rear vehicle wheels respectively.

Typically, the control valve 70 includes a normally open solenoid valve (not shown) between each of the brake circuits and the corresponding master cylinder reservoir. Upon actuation, the valve closes to isolate the brake circuit from the master cylinder 69. Accordingly, the valve is typically referred to as an isolation valve. For optimal control of the speed of each of the vehicle wheels, each of the wheel brakes can be provided an associated isolation valve. The control valve also typically includes a first normally closed valve (not shown) for each wheel brake that connects the wheel brake cylinder with a brake fluid reservoir (not shown). Upon actuation, the first normally closed valve is opened to bleed hydraulic fluid from the wheel brake cylinder and thereby reduce the pressure applied to the wheel brake. Accordingly, the first normally closed valve is usually referred to as a dump valve. The control valve also usually includes a second normally closed valve (not shown) for each wheel brake that connects the wheel brake cylinder with an outlet of the pump. Upon actuation, the first normally closed valve is opened to supply pressurized hydraulic fluid from the pump to the wheel brake cylinder and thereby raise the pressure applied to the wheel brake. Accordingly the second normally closed valve is usually referred to as an apply valve. The reservoir connected to the dump valves is connect to the pump inlet and thereby supplies hydraulic brake fluid to the motor driven pump.

The speed of the front wheels 78 and 77 are monitored by a first pair of wheel associated wheel speed sensors 78a and 77a, respectively. Similarly, the speed of wheels 80 and 79 of associated wheel speed sensors 80a and 79a, respectively. The wheel speed sensors 77a, 78a, 79a and 80a are electrically connected to an UBS electronic control unit (54). Closing the brake switch 67a provides a signal to the ECU 54 that the vehicle brakes have activated. The ECU 54 also is electrically connected to the pump motor and the actuation coils of the solenoid valves included with the control valve 70. The ECU 54 includes a microprocessor with a memory that stores a program that that run per the UBS control algorithm FIG. 11.

During vehicle operation in the dry mode/anti-lock mode, the microprocessor in the ECU 54 continuously receives speed signals from the wheel speed sensors 77a, 78a, 79a and 80a and from the spike position detectors (43 & 44) for each wheel via wireless remote terminal unit 45. The operation of the UBS operating in the dry mode/anti-lock brake with anti-skid is illustrated by the waveforms shown in FIG. 14, FIG. 16, FIG. 17, FIG. 18, & FIG. 19. A line labeled 90 in FIG. 14 illustrates the pressure being applied to one of the wheel brake cylinders as a function of time. At $t_1$, the brake pedal 67 FIG. 10 is depressed to begin applying pressure to the brake cylinders. The actual vehicle speed during the brake application as a function of time is illustrated by the line labeled 92 in FIG. 16. After $t_2$, the actual wheel speed 93 in FIG. 16 begins to decrease relative to the actual vehicle speed 92 in FIG. 16. Meanwhile, the microprocessor in the ECU 54 has calculated a theoretical speed ramp, shown by the dashed line labeled in FIG. 15 that represents the speed the vehicle would travel decelerated at a predetermined maximum rate, such as 1.0 g. The microprocessor continues to monitor the speed of the wheel relative to both the actual wheel speed and theoretical speed ramp. When the microprocessor detects that the wheel deceleration has reached a predetermined threshold value, such as 1.3 g, at $t_2$, the microprocessor causes the isolation valve associated with the wheel brake to close, as illustrated in FIG. 17, limiting the pressure applied to the wheel cylinder of a constant level $P_A$ in FIG. 14. The uncontrolled wheel brake pressure would continue to follow the dashed curve labeled 95 in FIG. 14.

When the difference between the actual wheel speed 93 in FIG. 16 and the calculated speed ramp 94 in FIG. 16 exceeds a predetermined slip threshold $S_t$, it is an indication that a predetermined slippage is occurring between the actual wheel speed and the vehicle speed and that the wheel has potential to lock-up. This point is shown at $t_3$ in FIG. 16. At this time, the wheel speed has fallen sufficiently that it is desirable to selectively reduce the pressure of the hydraulic fluid being applied to the wheel cylinder. Accordingly, the ECU microprocessor applies a series of pulses labeled shown in FIG. 18 to the dump valve associated with the wheel cylinder to lower pressure sufficiently to cause the wheel to spin back up to the vehicle speed, beginning at $t_4$. The lowered pressure is labeled $P_B$ in FIG. 14.

After the wheel speed attains the vehicle speed, it is desirable for the ECU microprocessor to apply a series of pulses at $t_5$ to the apply valve associated with the wheel cylinder to raise the pressure. The operation of the apply valve is illustrated in FIG. 19. These pulsed precipitate a second wheel speed departure at $t_6$. Upon correction of the second wheel speed departure with a second series of dump pulses, it is seen that the applied pressure $P_C$, while lower than the initial pressure $P_A$ is greater than the pressure $P_B$ present after correction of the first wheel speed departure. Thus, it is seen that the UBS provides control over the individual wheel speeds by switching between hold, dump of the solenoid valves included in the control valve 70 when operating in the dry mode.

Because the speed of each wheel is monitored separately, by utilizing a different algorithm for the microprocessor in the ECU 54, the system illustrated also may function as a Traction Control System (TCS) and/or a Vehicle Stability Control (VCS) system for dry, wet, ice and snow conditions and for slippery rigid surfaces and non-rigid surfaces when integrated with the wheel traction system.

The invention claimed is:

1. An adjustable wheel traction system for a vehicle, comprising:
    a wheel hub including a fixed or removably attachable housing, adjacent to a wheel, said attachable housing including a flexible circumferentially outer surface capable of supporting said vehicle in a case that a tire of said adjacent wheel of said vehicle is under-inflated;
    a plurality of mechanical spikes, able to extend, retract, and lock in place, with respect to said housing in which said spikes are disposed;
    a motor configured to extend and retract said plurality of spikes, said motor being controlled by a motor controller;
    a plurality of spike gears;
    a plurality of disc gears;
    a shock absorber which absorbs a shock when a spike is in contact with a road surface;
    a plurality of spike retraction springs disposed within elongated cavities of the housing, each spring cooperating with a spike and a disc gear to move under rotation of said spike gear;
    a means to environmentally seal each of said elongated cavities;
    a plurality of control latches configured to lock each spike in place in said extended and retracted positions;
    said housing containing a plurality of elongated water tight cavities running parallel to each spike and combining in a circular ring and containing a non-freezing coolant fluid with an electric heating element capable of heating said fluid;
    a plurality of latching solenoids configured to power said plurality of latches;
    a means to generate electricity to power an energy storage device which powers said adjustable wheel traction system, said means comprising a fly wheel configured to rotate with said vehicle wheel hub, a solar panel, or a hardwired connection with a power system of said vehicle;
    a remote terminal unit controller configured to control and monitor all electrical components of said adjustable wheel traction system;
    a charger controller configured to control said means to generate electricity;
    an electronics enclosure configured to hold said adjustable wheel traction system electronics;
    a plurality of spike status switches configured to detect when said spikes are extended or retracted;
    said vehicle comprising:
        a brake pedal configured to produce a braking pressure in a braking system proportionate to an operation travel of said brake pedal;
        a user display and control device configured to enable an operator of said vehicle to control said adjustable wheel traction system from inside a cab of said vehicle, said user display and control device communicating with said remote terminal unit controller to control said adjustable wheel traction system; and
        a brake electronic control unit communicating with the remote terminal unit controller;
    wherein, said spike gears are meshed with said disc gears, which are meshed with a main gear disc, so as to be caused to rotate by the motor to linearly actuate said plurality of spikes to contact a supporting surface of said vehicle to increase the friction between said vehicle and said supporting surface.

2. The adjustable wheel traction system for a vehicle according to claim 1, wherein said adjustable wheel traction system includes a manual mode of operation, selectable via a mode selector switch, wherein said spikes are configured to be extended a user designated distance via said display and control device.

3. The adjustable wheel traction system for a vehicle according to claim 1, wherein
    said adjustable wheel traction system includes a multiple mode wheel traction control operation, selectable via a mode selector switch, and configured to select one of multiple modes of operation based on said supporting surface conditions, said multiple modes including as least:
        a dry mode, wherein no spikes are extended except under emergency braking conditions, otherwise said vehicle braking system functions as an anti-locking braking control with continuous wheel slip control;
        a wet mode, wherein said plurality of spikes are extended a first predetermined distance;
        an ice mode, wherein said plurality of spikes are extended a second predetermined distance, greater than said first predetermined distance; and
        a snow mode, wherein said plurality of spikes are extended a third predetermined distance, greater than said second predetermined distance;
    said controller enabling momentary brake lockup, even during said anti-locking braking control, for at least one of said plurality of spikes to forcibly engage said supporting surface in order to create traction between said vehicle and said supporting surface.

4. The adjustable wheel traction system for a vehicle according to claim 3, further comprising:
    a brake switch (67A);
    a brake pressure sensor (68); and
    a solenoid (25),
    wherein said brake electronic control unit evaluates signal outputs from said switch and sensor to determine whether or not a slip of the extent to which momentary brake lockup control is necessary to allow a at least one of said plurality of spikes to engage said supporting surface in order to generate traction between said vehicle and said supporting surface in any one of a front, a rear, a left, and a right wheels of said vehicle, wherein said brake electronic control unit is configured to control a modulator based on the evaluated results of said slip detection, and to select and set one of a hydraulic pressure increase mode, a hydraulic pressure holding mode, and a hydraulic pressure reduction mode for each wheel.

5. The adjustable wheel traction system for a vehicle according to claim 1, further comprising:
    a plurality of spike start detectors (44, 44A, 44B, 44C);
    a plurality of stop detectors (43, 43A, 43B, 43C); and
    a plurality of magnetic sensors (63).

6. The adjustable wheel traction system for a vehicle according to claim 5, wherein
said brake electronic control unit is configured to receive a signal from said spike start detector to detect a next available spike, receive a signal from said spike status switch, and then based on a predetermined slip threshold, perform a momentary brake lockup for a predetermined time for a next available spike once it passes under the stop detector, such that said spike is configured to engage with said supporting surface, before returning to an anti-lock or anti-skid braking control with said plurality of spikes remaining extended until said anti-lock or anti-skid braking control terminates.

7. The adjustable wheel traction system for a vehicle according to claim 1, wherein said controller is configured to:
determine from a signal from said spike switch whether a spike has failed to extend as measured;
energize said latching solenoid to unrestrict movement of said wheel spike;
momentarily enter a dump control mode to relieve a hydraulic brake pressure and allow said wheel to freely spin such that said unextended spikes can be extended by centrifugal force; and then
de-energize said latching solenoid to cause said latch to lock said spikes in an extended position.

\* \* \* \* \*